(12) United States Patent
Shimada et al.

(10) Patent No.: US 11,421,741 B2
(45) Date of Patent: Aug. 23, 2022

(54) MANUFACTURING METHOD FOR SLINGER USED IN ROTARY SEAL, AND ROTARY SEAL

(71) Applicant: NAKANISHI METAL WORKS CO., LTD., Osaka (JP)

(72) Inventors: Wataru Shimada, Osaka (JP); Shinichi Akashi, Osaka (JP); Yusuke Iizawa, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 422 days.

(21) Appl. No.: 16/773,290

(22) Filed: Jan. 27, 2020

(65) Prior Publication Data

US 2020/0240473 A1 Jul. 30, 2020

(30) Foreign Application Priority Data

Jan. 29, 2019 (JP) .............................. JP2019-013117

(51) Int. Cl.
*F16C 33/78* (2006.01)
*F16C 43/04* (2006.01)
*B21D 53/10* (2006.01)

(52) U.S. Cl.
CPC ............ *F16C 43/045* (2013.01); *B21D 53/10* (2013.01); *F16C 33/782* (2013.01); *F16C 2220/02* (2013.01)

(58) Field of Classification Search
CPC .... F16C 43/045; F16C 33/782; F16C 19/186; F16C 33/7826; F16C 33/7883; F16C 33/7806; F16C 33/7823; F16C 33/7889; B21D 53/10; B21D 53/20; B21D 19/088
See application file for complete search history.

(56) References Cited

U.S. PATENT DOCUMENTS

2018/0258996 A1\* 9/2018 Sato .................... F16C 33/7823
2019/0277340 A1\* 9/2019 Shuto ..................... F16C 19/18

FOREIGN PATENT DOCUMENTS

| JP | 4997532 B2 | 8/2012 |
| JP | 2012159170 A | 8/2012 |
| JP | 5234651 B2 | 7/2013 |
| JP | 2018150954 A | 9/2018 |

\* cited by examiner

*Primary Examiner* — Jun S Yoo
(74) *Attorney, Agent, or Firm* — Innovation Capital Law Group, LLP; Vic Lin (57) ABSTRACT

A manufacturing method of a slinger, includes steps of: molding an annular blank material from a dull-finished steel sheet material through sheet metal press working or the like; and burring the blank material to mold a slinger. The values of the arithmetical mean roughness Ra of faces, of a burring mold, which individually come into contact with first and second slide-contact surfaces of the slinger, are set to 0.03 µm≤Ra≤0.07 µm. A ratio of pressure application force for holding the blank material between the faces to the 0.2% proof stress of the dull-finished material, is set to 1.0 or more and 1.53 or less. A clearance for the burring mold is set to T×(0.9 to 0.7) where "T" represents the sheet thickness of the blank material.

2 Claims, 6 Drawing Sheets

MANUFACTURING METHOD FOR SLINGER USED IN ROTARY SEAL, AND ROTARY SEAL

BACKGROUND OF THE INVENTION

Field of the Invention

The present invention relates to a manufacturing method for a slinger used in a rotary seal including the slinger, a core metal, and a seal member.

Description of the Background Art

There have been rotary seals including a slinger, a core metal, and a seal member, as rotary seals used in bearing devices for supporting wheels of automobiles and other bearing devices (see, for example, Patent Literatures 1 to 3).

Here, the slinger includes a cylindrical sleeve and a flange extending outward in the radial direction from one end of the sleeve in the axial direction.

The core metal includes a core metal cylinder having a cylindrical shape, and a core metal flange extending inward in the radial direction from one end of the core metal cylinder in the axial direction.

The seal member includes a base portion joined to the core metal, and a seal lip portion extending from the base portion.

Such a rotary seal is used in a state where the sleeve of the slinger is mounted to a radially-inner member and the core metal cylinder of the core metal is mounted to a radially-outer member, and the seal lip portion of the seal member is in slidable contact with a slide-contact surface of the slinger.

There has been considerable intensification of a social demand for improving the fuel consumption rates of automobiles and the like, from the viewpoints of reduction of energy cost and reduction of greenhouse effect gas.

In view of such a social demand, the following measure has been taken in rotary seals of Patent Literatures 1 and 2. The slide-contact surface of the slinger is subjected to surface machining so as to be formed as an uneven surface in order to improve oil film retainability between the seal lip portion of the seal member and the slide-contact surface of the slinger and reduce the running torque of the rotary seal.

For example, in Patent Literature 1, the slide-contact surface is processed by causing fine rigid particles to impact therewith so that the slide-contact surface is formed as an uneven surface having a large number of dimples.

In addition, in Patent Literature 2, the slide-contact surface is subjected to cutting processing, unevenness transfer in which unevenness formed on a mold is transferred to the slinger, wet blasting, shot peening, or the like, so that the slide-contact surface is formed as an uneven surface having a narrow pitch in roughness and no edges.

When a slide-contact surface of a slinger is formed as an uneven surface through another step separate from press working for molding the slinger, such as a step of fine-rigid particle impact, cutting processing, wet blasting, or shot peening, an additional manufacturing cost for performing the step is unfortunately required.

Patent Literature 3 discloses that a slinger having an uneven surface on a slide-contact surface of the slinger is manufactured by press-molding a dull-finished steel sheet material, in order to reduce manufacturing cost while reducing the running torque of the rotary seal.

CITATION LIST

Patent Literature

[PTL 1] Japanese Patent No. 4997532
[PTL 2] Japanese Patent No. 5234651
[PTL 3] Japanese Unexamined Patent Application Publication No. 2018-150954

The inventors of the present application have concretely assessed and examined a method for manufacturing a slinger by press-molding a dull-finished steel sheet material.

Specifically, a test was first performed for obtaining the relationship between the surface roughness of a slide-contact surface of a slinger and the wear amount of a seal lip portion of a seal member. Then, the obtained relationship was used for further obtaining a range of the surface roughness of the slide-contact surface of the slinger, within which wear of the seal lip portion of the seal member could be prevented, while oil film retainability between the seal lip portion and the slide-contact surface of the slinger was ensured.

Next, commercially available dull-finished steel sheet materials were purchased as materials for slingers, and were to be subjected to press-molding. Then, variation in surface roughness among the commercially available dull-finished steel sheet materials was checked. As a result, it was found that there was a significant variation in surface roughness among the dull-finished materials.

Next, each purchased dull-finished steel sheet material was actually subjected to press-molding to manufacture a slinger. The surface roughness of the slide-contact surface of the slinger was assessed and examined. As a result, it has been found that the surface roughness of the slide-contact surface of the slinger falls within the aforementioned range in which the wear of the seal lip portion of the seal member can be prevented, by molding a slinger through the press-molding with a predetermined method on the dull-finished steel sheet material with a significant variation in the surface roughness. Accordingly, the present invention has been completed.

SUMMARY OF THE INVENTION

An object of the present invention is to provide a method for inexpensively and efficiently manufacturing a slinger used in a rotary seal capable of suppressing wear of a seal lip portion of a seal member while ensuring oil film retainability between the seal lip portion and a slide-contact surface of the slinger.

The summary of the present invention is as follows.

[1] A manufacturing method of a slinger to be used in a rotary seal that includes the slinger, a core metal, and a seal member, the slinger including a cylindrical sleeve and a flange extending outward in a radial direction from one end of the sleeve in an axial direction, the core metal including a core metal cylinder having a cylindrical shape, and a core metal flange extending inward in the radial direction from one end of the core metal cylinder in the axial direction, the seal member including a base portion joined to the core metal, and a seal lip portion extending from the base portion, the seal lip portion including an axial lip in slidable contact with a first slide-contact surface that is an inner surface of the flange of the slinger, and a radial lip in slidable contact with a second slide-contact surface that is an outer circumferential surface of the sleeve of the slinger, the manufacturing method comprising:

molding an annular blank material from a dull-finished steel sheet material through sheet metal press working, laser cutting machining, or wire cut electric discharge machining; and burring the annular blank material, so as to mold the slinger, wherein the burring is performed using a mold having faces each of which has an arithmetical mean roughness Ra set to 0.03 μm≤Ra≤0.07 μm, the faces individually coming into contact with the first slide-contact surface and the second slide-contact surface, a ratio of pressure application force for holding the annular blank material between the faces to a 0.2% proof stress of the dull-finished material, is set to 1.0 or more and 1.53 or less, a clearance for the mold used for the burring is set to T×(0.9 to 0.7) where "T" represents a sheet thickness of the annular blank material, and, with these conditions, an arithmetical mean roughness Ra of each of the first slide-contact surface and the second slide-contact surface of the slinger to fall within a predetermined range of 0.25 μm≤Ra≤0.5 μm.

[2] A manufacturing method of a slinger to be used in a rotary seal that includes the slinger, a core metal, and a seal member, the slinger including a cylindrical sleeve and a flange extending outward in a radial direction from one end of the sleeve in an axial direction, the core metal including a core metal cylinder having a cylindrical shape, and a core metal flange extending inward in the radial direction from one end of the core metal cylinder in the axial direction, the seal member including a base portion joined to the core metal, and a seal lip portion extending from the base portion, the seal lip portion including an axial lip in slidable contact with a first slide-contact surface which is an inner surface of the flange of the slinger, and a radial lip in slidable contact with a second slide-contact surface which is an outer circumferential surface of the sleeve of the slinger, the manufacturing method comprising:

molding an annular blank material from a dull-finished steel sheet material through sheet metal press working, laser cutting machining, or wire cut electric discharge machining;

burring the annular blank material, so as to mold the slinger; and pressing a mold against the first slide-contact surface of the molded slinger, wherein the burring is performed using a mold having a face that has an arithmetical mean roughness Ra set to 0.03 μm≤Ra≤0.07 μm, the face coming into contact with the second slide-contact surface, a clearance for the mold used for the burring is set to T×(0.9 to 0.7) where "T" represents a sheet thickness of the annular blank material, the pressing is performed using a mold having a face with an arithmetical mean roughness Ra set to 0.03 μm≤Ra≤0.07 μm, the face coming into contact with the first slide-contact surface, a ratio of pressing force for pressing the mold in the pressing to a 0.2% proof stress of the dull-finished material is set to 1.0 or more and 1.53 or less, and, with these conditions, an arithmetical mean roughness Ra of each of the first slide-contact surface and the second slide-contact surface of the slinger to fall within a predetermined range of 0.25 μm≤Ra≤0.5 μm.

[3] A rotary seal including a slinger manufactured through the manufacturing method described above in [1] or [2].

The manufacturing method for a slinger used in a rotary seal according to the present invention mainly exhibits the following advantageous effects.

(1) The annular blank material is molded from the dull-finished steel sheet material, and the annular blank material is burred (claim 1) or the annular blank material is burred and pressed (claim 2), whereby the surface roughness of each of the first slide-contact surface and the second slide-contact surface of the slinger can be set to fall within the predetermined range (0.25 μm≤Ra≤0.5 μm). Accordingly, the slinger used in the rotary seal can be inexpensively and efficiently manufactured.

(2) In a particular method of the present invention, the annular blank material is molded from the dull-finished steel sheet material and the annular blank material is burred. Accordingly, the surface roughness of each of the slide-contact surfaces of the slinger falls within the predetermined range (claim 1), the surface roughness of each of the first slide-contact surface and the second slide-contact surface of the slinger can be set to fall within the predetermined range through the burring. Accordingly, the separate step such as the pressing step becomes unnecessary, and thus the slinger can be further inexpensively manufactured.

(3) The predetermined range is a range that is determined based on experiments by the inventors of the present application. If the surface roughness of each of the first slide-contact surface and the second slide-contact surface of the slinger is set to fall within the predetermined range, it is possible to make the wear amount of each of the axial lip and the radial lip small while the oil film retainability is ensured.

In the slinger manufactured through the manufacturing method according to the present invention, the surface roughness of each of the first slide-contact surface with which the axial lip is in slidable contact and the second slide-contact surface with which the radial lip is in slidable contact, is within the predetermined range. Accordingly, in the rotary seal using the slinger, the wear amount of each of the axial lip and the radial lip can be reduced while the oil film retainability is ensured.

DESCRIPTION OF THE PREFERRED EMBODIMENTS

Hereinafter, an embodiment of the present invention will be described in detail with reference to the accompanying drawings.

As used herein, in a state where a rotary seal is mounted to a bearing device for supporting a wheel of an automobile, the direction of the rotation axis of the bearing device is referred to as "axial direction", and a direction perpendicular to the axial direction is referred to as "radial direction".

In addition, a direction from a vehicle body of the automobile toward the wheel side is referred to as "outboard", and the direction opposite thereto is referred to as "inboard".

<Bearing Device>

Figure 1:
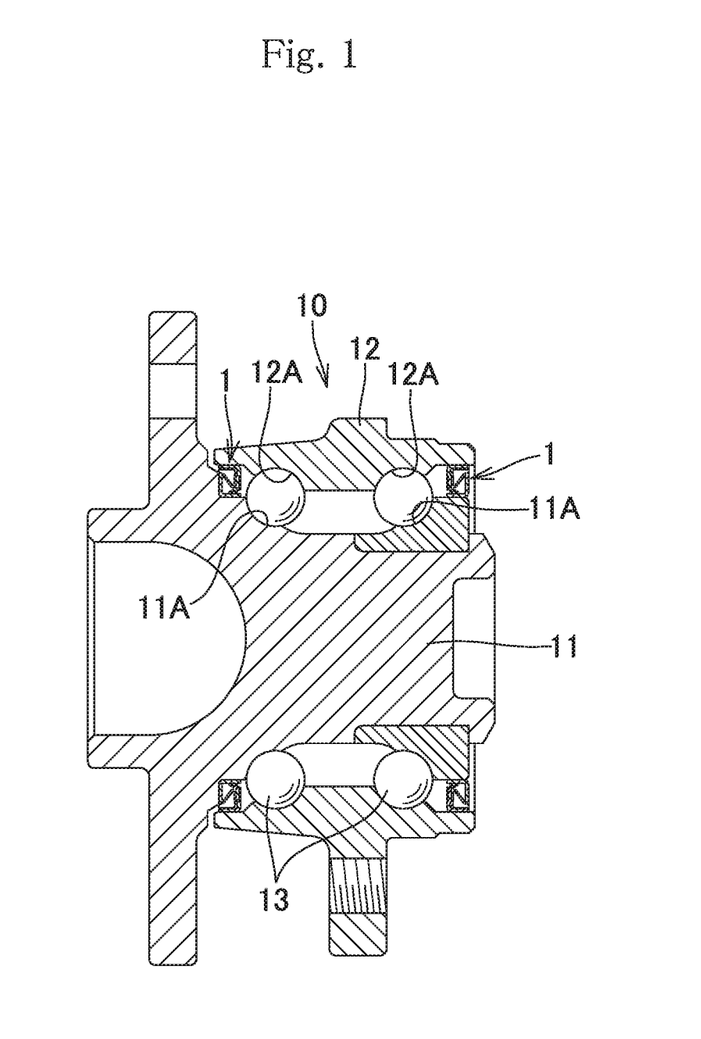
FIG. 1 is a vertical sectional view schematically showing a part of the example in which rotary seals according to an embodiment of the present invention are used in a bearing device for supporting a wheel of an automobile.

A vertical sectional view in FIG. 1 schematically shows a part of the example in which rotary seals 1 according to the embodiment of the present invention are used in a bearing device 10 for supporting a wheel of an automobile.

The bearing device 10 includes a bearing including: an inner ring 11 which has an inner ring raceway surface 11A formed on the outer circumferential surface thereof and rotates together with the wheel; an outer ring 12 which has an outer ring raceway surface 12A formed on the inner circumferential surface thereof and is integrated with the vehicle body; balls 13 serving as rolling elements which roll between the inner ring raceway surface 11A and the outer ring raceway surface 12A; and the like.

In addition, the bearing device 10 includes the rotary seals 1 which are respectively located, between the inner ring 11 and the outer ring 12, at the inboard-side end and the outboard-side end (on the inboard side relative to the inboard-side balls 13, and on the outboard side relative to the outboard-side balls 13). The rotary seals 1 prevent entry of muddy water and the like and prevent leakage of lubricating grease.

<Rotary Seal>

In the schematic vertical-sectional view in FIG. 1, the respective outboard-side and inboard-side rotary seals 1 have the same structure.

Figure 2:
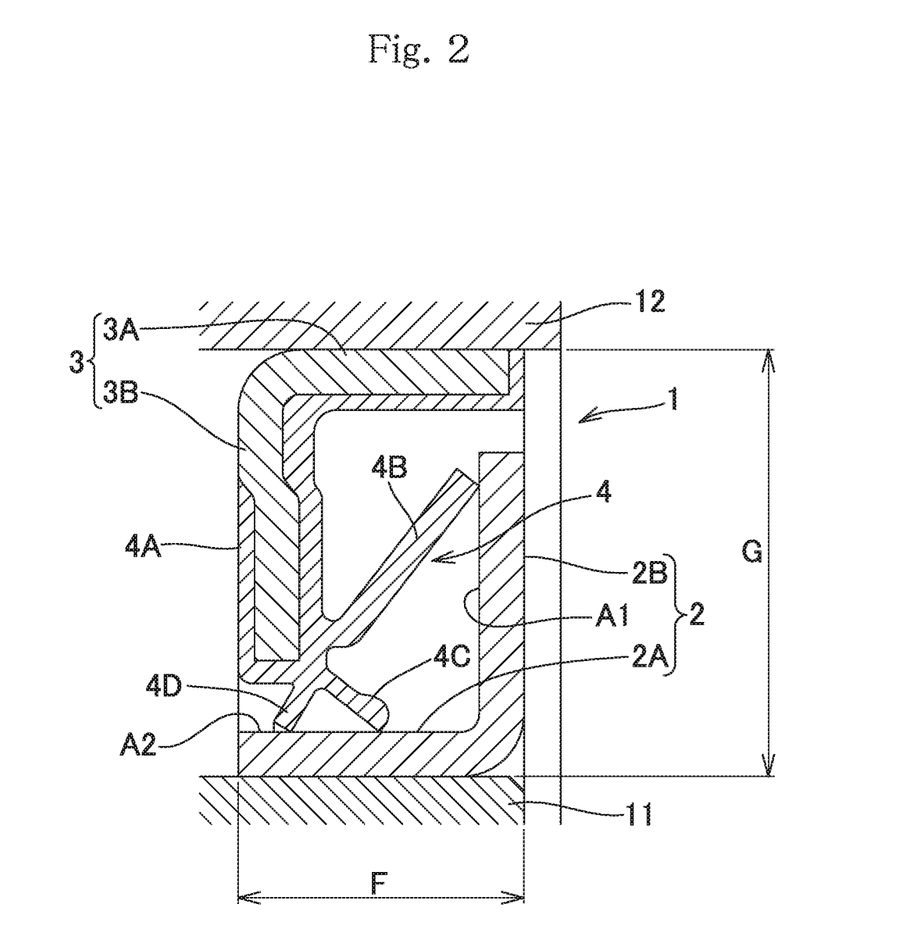
FIG. 2 is a vertical sectional view showing a major part around an inboard-side rotary seal.

The enlarged major part of each of the rotary seals 1 is shown in the vertical sectional view in FIG. 2. Regarding the lengths (thicknesses) F in the axial direction of the rotary seals 1, the length F of the inboard-side rotary seal 1 is 3.5 mm≤F≤7 mm and the length F of the outboard-side rotary seal 1 is 5 mm≤F≤10 mm.

Regarding the lengths (widths) G in the radial direction of the rotary seals 1 shown in the vertical sectional view in FIG. 2, the length G of each of the inboard-side and outboard-side rotary seals 1 is 5 mm≤G≤9 mm.

Since the outboard-side and inboard-side rotary seals 1 have the same structure, the inboard-side rotary seal 1 shown in FIG. 2 will be described.

The rotary seal 1 according to the embodiment of the present invention includes a slinger 2, a core metal 3, and a seal member 4. The slinger 2 and the core metal 3 are each made of a stainless steel sheet through, for example, press working. The seal member 4 is an elastic body such as rubber, and has a base portion 4A joined to the core metal 3.

The seal member 4 is formed from a synthetic rubber material that may be obtained by appropriately blending, as rubber raw materials having high oil resistance, one or more rubbers among nitrile rubber (NBR), hydrogenated nitrile rubber (HNBR), acrylic rubber (ACM), ethylene-acrylic rubber (AEM), fluororubber (FKM, FPM), silicone rubber (VQM), and others. When the kneadability, the vulcanization moldability, and adhesion (to the core metal 3) of the rubber material are taken into consideration, it is also preferable to blend another rubber such as liquid NBR, ethylene-propylene rubber (EPDM), natural rubber (NR), isoprene rubber (IR), styrene-butadiene rubber (SBR), or butadiene rubber (BR).

The slinger 2 includes a cylindrical sleeve 2A and a flange 2B extending outward in the radial direction from the inboard-side end of the sleeve 2A.

The core metal 3 includes a core metal cylinder 3A having a cylindrical shape, and a core metal flange 3B extending inward in the radial direction from the outboard-side end of the core metal cylinder 3A.

The seal member 4 includes the base portion 4A and seal lip portions 4B, 4C, and 4D projecting from the base portion 4A.

The core metal cylinder 3A of the rotary seal 1 is mounted to the outer ring 12 which is a radially-outer member, and the sleeve 2A of the rotary seal 1 is mounted to the inner ring 11 which is a radially-inner member.

The seal lip portion 4B of the seal member 4 is an axial lip that projects in a diameter-increasing manner from the base portion 4A toward the inboard side. The distal end of the axial lip 4B is in slidable contact with a first slide-contact surface A1 which is an outboard-side surface of the flange 2B of the slinger 2.

The seal lip portions 4C and 4D of the seal member 4 are each a radial lip that projects inward in the radial direction from the base portion 4A. The distal end of each of the radial lips 4C and 4D is in slidable contact with a second slide-contact surface A2 which is the outer circumferential surface of the sleeve 2A of the slinger 2.

Although no encoder is joined to the flange 2B of the slinger 2 in an example of the structure of the rotary seal 1 shown in FIG. 2, a structure in which an encoder made of a resin magnet or a rubber magnet is joined to the flange 2B may be employed as appropriate.

The slinger 2 is made of a commercially available dull-finished (the term "dull finish" is defined in JIS G 0203: 2009 Glossary of terms used in iron and steel) steel sheet material through a predetermined method described later. The surface roughness (arithmetical mean roughness Ra) of each of the slide-contact surfaces A1 and A2 is set to fall within a predetermined range (0.25 μm≤Ra≤0.5 μm) based on the results of the following wear amount measurement tests.

<Wear Amount Measurement Tests>

(Purpose)

To obtain a range, of the roughness of the first slide-contact surface A1 of the slinger 2, in which wear of the axial lip 4B of the seal member 4 can be prevented while oil film retainability is ensured between the axial lip 4B and the first slide-contact surface A1 of the flange 2B of the slinger 2.

(Measurement of Surface Roughness)

Assessment was performed on the slinger 2 of each of No. 1 to 6 in Table 1 based on "7. Rules and procedures for assessment with stylus-type surface roughness measuring machine" of JIS B 0633: 2001 (ISO 4288: 1996). Specifically, with the reference length being 0.8 mm and the assessment length being 4 mm, a stylus-type surface roughness measuring machine (surface roughness/contour shape measurement machine manufactured by TOKYO SEIMITSU CO., LTD., model name: SURFCOM 1800D) was used to perform measurement on the first slide-contact surface A1 with which the axial lip 4B was to be slidably in contact. As a result, a roughness curve was obtained in the circumferential direction perpendicular to a rolling direction, and an arithmetical mean roughness Ra was obtained based on the roughness curve.

(Measurement of Wear Amount)

In a state where the slinger 2 of each of No. 1 to 6 in Table 1 was mounted in the rotary seal 1, grease was sealed in an amount of 0.24 g which was a normal amount, and rotation was performed for 60 hours at a rotation speed of 1000 rpm. Thereafter, the wear amount of the axial lip 4B was measured.

Figure 3:
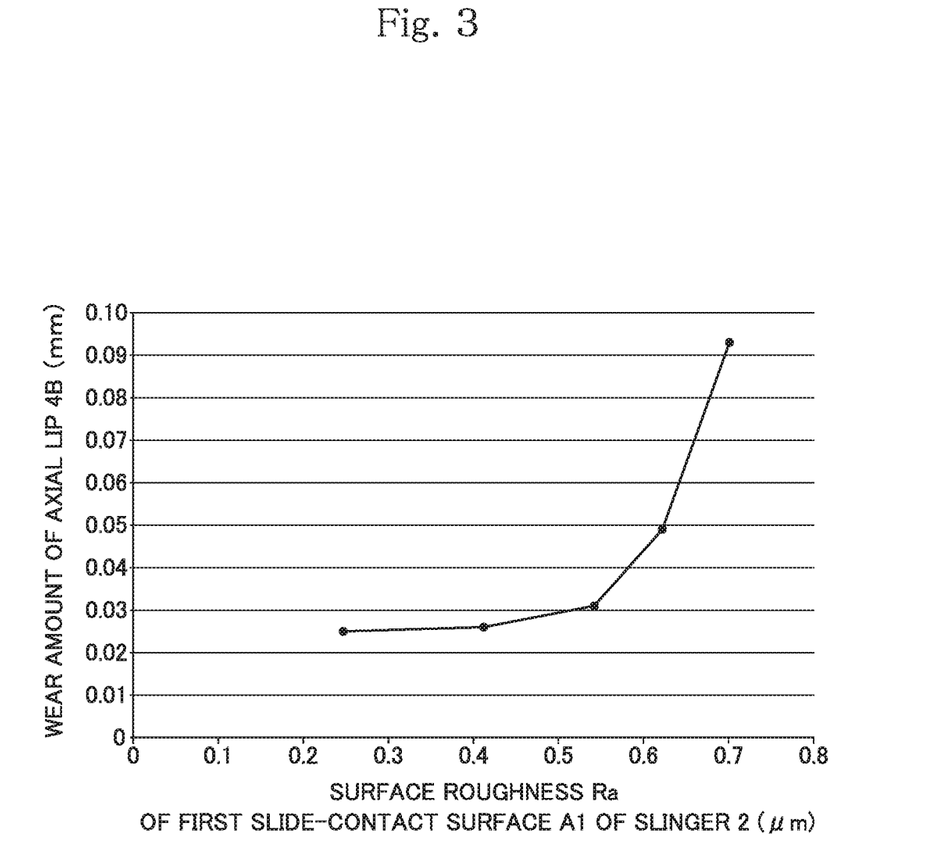
FIG. 3 is a graph indicating the relationship between the surface roughness of a slide-contact surface of a slinger and the wear amount of an axial lip.

As known from the relationship between the surface roughness (arithmetical mean roughness Ra) of the first slide-contact surface A1 of the slinger 2 and the wear amount of the axial lip 4B, as shown in the graph in FIG. 3, the wear amount of the axial lip 4B rapidly increases when the surface roughness (arithmetical mean roughness Ra) of the first slide-contact surface A1 of the slinger 2 exceeds 0.5 µm. In addition, when the surface roughness (arithmetical mean roughness Ra) of the first slide-contact surface A1 of the slinger 2 is about 0.2 µm, galling occurs.

Table 1 and FIG. 3 show that, if the surface roughness (arithmetical mean roughness Ra) of the first slide-contact surface A1 of the slinger 2 is set to 0.25 µm≤Ra≤0.5 µm, galling does not occur and the wear amount of the axial lip 4B can be made small after the rotation is performed for 60 hours at a rotation speed of 1000 rpm.

TABLE 1

| No. | Surface roughness (Ra) of first slide-contact surface A1 of slinger 2 µm | Wear amount of axial lip 4B mm |
| --- | --- | --- |
| 1 | 0.247 | 0.025 |
| 2 | 0.412 | 0.026 |
| 3 | 0.542 | 0.031 |
| 4 | 0.622 | 0.049 |
| 5 | 0.701 | 0.093 |
| 6 | 0.198 | Galling occurred |

As shown in the above, if the surface roughness (arithmetical mean roughness Ra) of the first slide-contact surface A1 of the slinger 2 is set to 0.25 µm≤Ra≤0.5 µm, it is possible to make the wear amount of the axial lip 4B small while ensuring the oil film retainability. In particular, if the surface roughness (arithmetical mean roughness Ra) of the first slide-contact surface A1 of the slinger 2 is set to 0.25 µm≤Ra≤0.4 µm, it is possible to make the wear amount of the axial lip 4B even smaller while ensuring the oil film retainability.

The same applies to the surface roughness (arithmetical mean roughness Ra) of the second slide-contact surface A2 of the slinger 2. Specifically, if the surface roughness Ra is set to 0.25 µm≤Ra≤0.5 µm, it is possible to make the wear amount of each of the radial lips 4C and 4D small while ensuring the oil film retainability. In particular, if the surface roughness (arithmetical mean roughness Ra) of the second slide-contact surface A2 of the slinger 2 is set to 0.25 µm≤Ra≤0.4 µm, it is possible to make the wear amount of each of the radial lips 4C and 4D even smaller while ensuring the oil film retainability.

<Manufacturing Method for Slinger>

(Check of Variation Among Dull-Finished Steel Sheet Materials)

In a manufacturing method for the slinger according to the present invention, the slinger is molded from a dull-finished steel sheet material, and thus variation in surface roughness among commercially available dull-finished steel sheet materials is checked.

Two lots each containing five pieces of SUS430 as dull-finished steel sheet materials were purchased, and the surface roughnesses (arithmetical mean roughnesses Ra) of the total of ten pieces were measured.

As a result, there was a variation among the purchased ten pieces of SUS430 in a range of 0.5 µm≤Ra≤0.82 µm, and the arithmetical mean of the arithmetical mean roughnesses Ra of the total of ten pieces was 0.61 µm.

(Step of Molding Annular Blank Material)

Figure 4A:
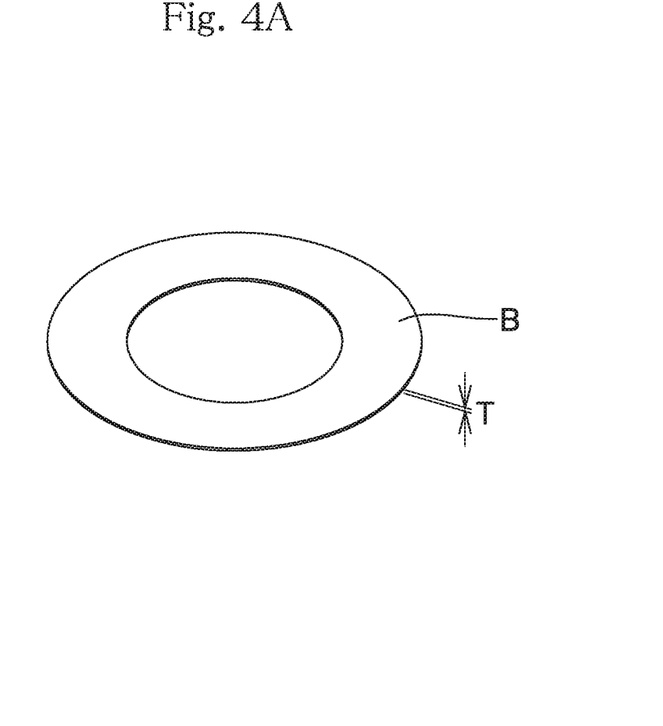
FIG. 4A is a perspective view of an annular blank material.

An annular blank material B shown in a perspective view in FIG. 4A is molded from each dull-finished steel sheet material through sheet metal press working, laser cutting machining, or wire cut electric discharge machining. It is preferable to mold the annular blank material B through sheet metal press working from the viewpoint of reducing manufacturing cost for the slinger 2 as much as possible.

(Step of Molding Slinger)

Figure 5A:
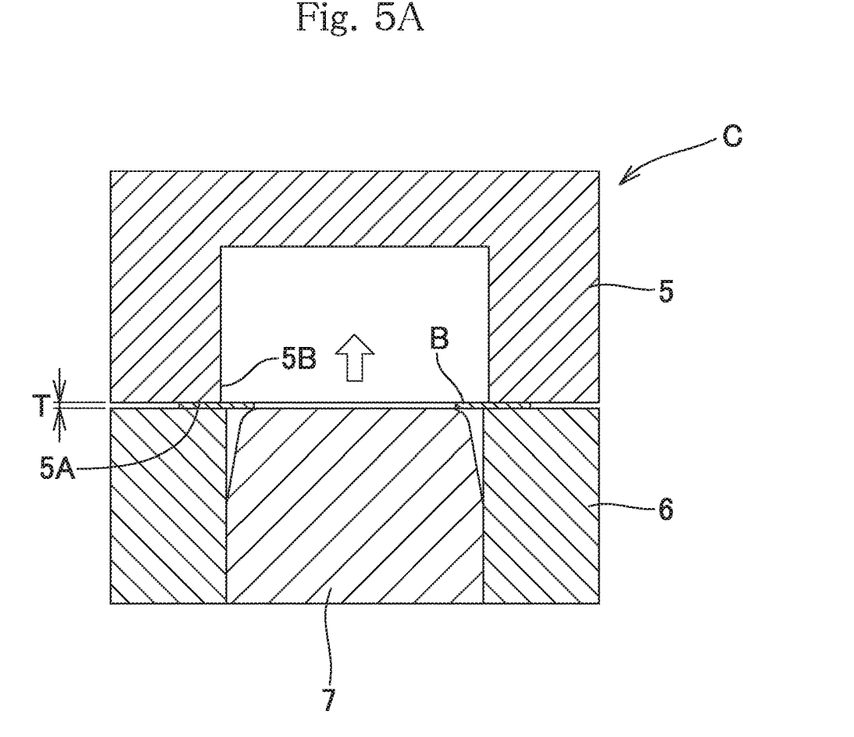
FIG. 5A is a vertical sectional view schematically showing a burring mold in a state where a punch is located at the bottom dead center.

The annular blank material B is set between a die 5 and a stripper 6 of a burring mold C shown in a schematic vertical sectional view in FIG. 5A.

Figure 5B:
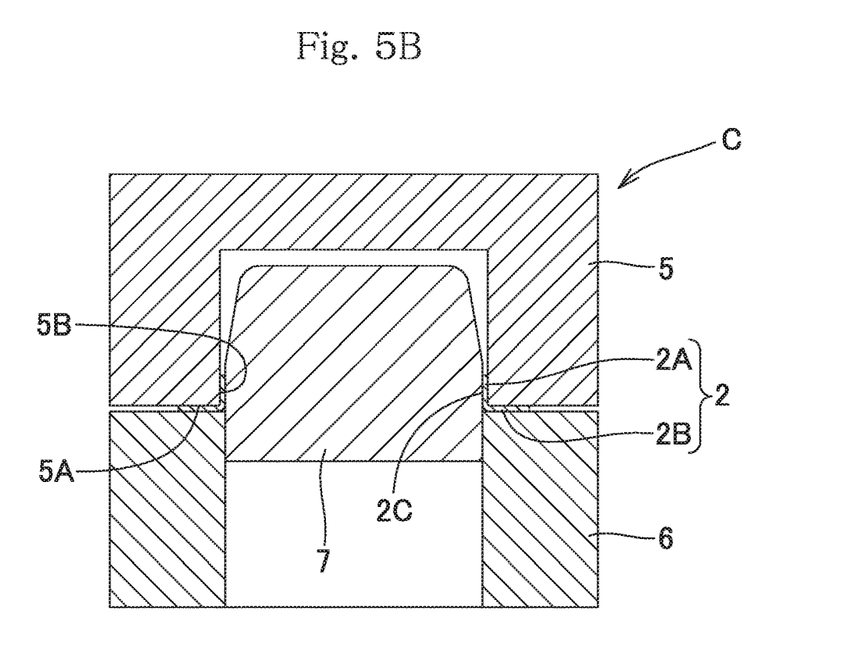
FIG. 5B is a vertical sectional view schematically showing the burring mold in a state where the punch is located at the top dead center.

Next, a punch 7 located at the bottom dead center in the schematic vertical sectional view in FIG. 5A is moved to the top dead center as shown in a schematic vertical sectional view in FIG. 5B, and the slinger 2 is molded by the pressing force of the punch 7.

The punch 7 has a lower side-surface portion formed in a cylindrical shape and an upper side-surface portion formed in a truncated conical surface. In addition, the truncated conical shape of the upper side-surface portion of the punch 7 has the upper-end corner with a curved surface, and the curved surface comes into contact with an inner-diameter portion of the annular blank material B shown in FIG. 5A.

Figure 4B:
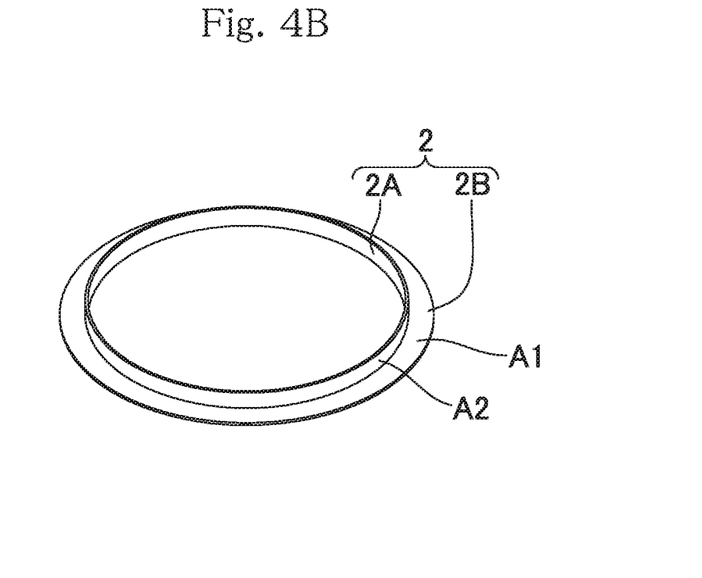
FIG. 4B is a perspective view of the slinger.

The slinger 2 taken out from the burring mold C after the slinger 2 is molded as in FIG. 5B, is shown alone in the perspective view in FIG. 4B.

<Roughness Processing Test>

(Purpose)

The manufacturing method for the slinger 2 to be used in the rotary seal 1 according to the present invention allows the surface roughness (arithmetical mean roughness Ra) of each of the slide-contact surfaces A1 and A2 of the slinger 2 to fall within the predetermined range (0.25 µm≤Ra≤0.5 µm) through the aforementioned steps of molding the slinger. In order to obtain an effective range for pressure application force of the burring mold C, a test in which pressure is applied to each piece of SUS430 which is a dull-finished steel sheet material by a roughness processing testing mold, is performed, and the relationship between the surface roughness of the raw material and the surface roughness after the pressure application is obtained.

(Material)

Values of each of the pieces of SUS430 to be used, which were described in a steel inspection certificate (mill test report) at the time of manufacturing, were as follows: the 0.2% proof stress was 283 MPa, the tensile strength was 454 MPa, and the sheet thickness was 0.6 mm.

Standard values of each piece of SUS430 are as follows: the 0.2% proof stress is 205 MPa and the tensile strength is 420 MPa.

(Test Pieces)

Circular blank materials were prepared from purchased materials, for each roughness of the raw materials. The blank materials were grouped into the following groups 1 to 4 based on the surface roughnesses (arithmetical mean roughnesses Ra) of the raw materials.

(1) Group 1: Ra is 0.82±0.01 μm (2) Group 2: Ra is 0.65±0.01 μm (3) Group 3: Ra is 0.61±0.01 μm (4) Group 4: Ra is 0.50±0.01 μm (Test Method)

Figure 6:
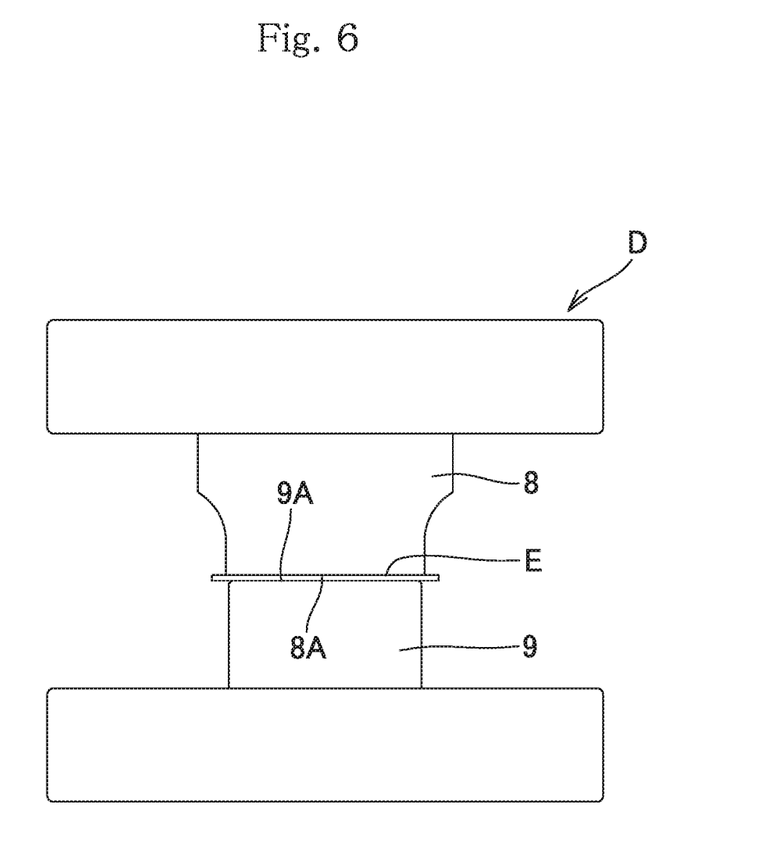
FIG. 6 is a schematic view of a mold for testing roughness processing.

Each circular blank material E was set between an upper mold 8 and a lower mold 9 of a roughness processing testing mold D shown in a schematic view in FIG. 6. The surface roughness (arithmetical mean roughness Ra) of the lower face 8A of the upper mold 8 for pressing the circular blank material E was set to 0.07 μm, and the surface roughness (arithmetical mean roughness Ra) of the upper face 9A of the lower mold 9 for pressing the circular blank material E was set to 0.03 μm.

Pressure was applied by the roughness processing testing mold D with pressure application forces of 143 MPa, 295 MPa, and 433 MPa, and the surface roughness (arithmetical mean roughness Ra) of the circular blank material E after the pressure application was measured.

(Test Results and Observations)

As indicated by the measurement results in Table 2 and Table 3, the smallest value and the largest value among the surface roughnesses (arithmetical mean roughnesses Ra) of the circular blank materials E after the pressure application, were 0.32 μm (Ra of mold: 0.03, pressure application force: 433 MPa) and 0.61 μm (Ra of mold: 0.07, pressure application force: 143 MPa), respectively.

The measurement results indicated in Table 2 and Table 3 show that 295 MPa to 433 MPa is the range of the pressure application force for allowing the surface roughness (arithmetical mean roughness Ra) to fall within the predetermined range (0.25 μm≤Ra≤0.5 μm), in order to make the wear amount of the axial lip 4B small while ensuring the oil film retainability.

Tables also show that the surface roughness (arithmetical mean roughness Ra) of the mold only has to be 0.03 to 0.07 μm (about 10% of the roughnesses of the raw materials).

TABLE 2

Surface roughness of circular blank material made of dull-finished steel sheet material (SUS430) (arithmetical mean roughness Ra)

| | | Surface having been brought into contact with upper mold (Ra: 0.07) | | |
|---|---|---|---|---|
| Group | Raw material | Pressure application force: 143 MPa | Pressure application force: 295 MPa | Pressure application force: 433 MPa |
| 1 | 0.82 ± 0.01 | 0.61 | 0.49 | 0.47 |
| 2 | 0.65 ± 0.01 | 0.59 | 0.48 | 0.47 |
| 3 | 0.61 ± 0.01 | 0.58 | 0.48 | 0.45 |
| 4 | 0.50 ± 0.01 | 0.47 | 0.40 | 0.37 |

TABLE 3

Surface roughness of circular blank material made of dull-finished steel sheet material (SUS430) (arithmetical mean roughness Ra)

| | | Surface having been brought into contact with lower mold (Ra: 0.03) | | |
|---|---|---|---|---|
| Group | Raw material | Pressure application force: 143 MPa | Pressure application force: 295 MPa | Pressure application force: 433 MPa |
| 1 | 0.82 ± 0.01 | 0.58 | 0.49 | 0.44 |
| 2 | 0.65 ± 0.01 | 0.51 | 0.44 | 0.41 |
| 3 | 0.61 ± 0.01 | 0.50 | 0.42 | 0.39 |
| 4 | 0.50 ± 0.01 | 0.45 | 0.40 | 0.32 |

When a slinger is prepared by using a mold as shown in FIG. 5A and FIG. 5B, it is necessary to control the roughness of a surface (slide-contact surface A1 of the flange 2B in FIG. 4B) of the annular blank material B on the side closer to the die 5. The axial lip 4B (FIG. 2) is in slidable contact with this surface.

Specifically, burring is performed with the surface roughness (arithmetical mean roughness Ra) of the lower face 5A of the die 5 being set to 0.03 to 0.07 μm and with the pressure application force of the stripper 6 of the burring mold C being set to 295 MPa to 433 MPa. Here, the pressure application force of the stripper 6 is adjusted by means of a hydraulic cylinder, a gas spring, or the like.

Meanwhile, the slide-contact surface A2 which is the outer circumferential surface of the sleeve 2A in FIG. 4B, and with which the radial lips 4C and 4D (FIG. 2) are to be in slidable contact, can be formed by performing burring using a predetermined clearance (gap between the die 5 and one side of the punch 7) in an area that extends upright so as to be perpendicular to the flange 2B, with the surface roughness (arithmetical mean roughness Ra) of the inner circumferential surface 5B of the die 5 in FIG. 5A and FIG. 5B being set to 0.03 to 0.07 μm.

The clearance is set to T×(0.9 to 0.7) where "T" (see FIG. 4A and FIG. 5A) represents the sheet thickness of the annular blank material B.

When the slinger 2 is molded by processing the annular blank material B with the burring mold C as in FIG. 5A and FIG. 5B, the punch 7 is moved in a state where the annular blank material B is held between the die 5 and the stripper 6. The sleeve 2A is formed using the punch 7 by increasing the hole diameter and raising the rim as a result of bringing the truncated conical surface of the upper side-surface portion of the punch 7 into contact with an inner circumferential surface 2C (see FIG. 5B) on the opposite side to the second slide-contact surface A2 (see FIG. 4B) with which the radial lips 4C and 4D are to be in slidable contact.

When a corner portion of the sleeve 2A becomes substantially at the right angle in the course of the movement of the punch 7 from the state shown in FIG. 5A to the state shown in FIG. 5B, the second slide-contact surface A2 (see FIG. 4B) comes into contact with the inner circumferential surface 5B (Ra: 0.03 to 0.07 μm) of the die 5. When the punch 7 further moves, the inner circumferential surface 2C of the sleeve 2A is rubbed by the punch 7, and the second slide-contact surface A2 is pressed against the inner circumferential surface 5B of the die 5.

In this manner, the inner circumferential surface 2C of the sleeve 2A is subjected to processing while being kept constantly in contact with the punch 7 from the time at which the rim starts to be raised in the initial stage of the burring. The second slide-contact surface A2 of the sleeve 2A is pressed against the inner circumferential surface 5B of the die 5 in the final stage of the burring.

In the slinger 2 (shown in FIG. 4B) obtained by subjecting the annular blank material B molded from the dull-finished steel sheet material to the processing with the burring mold C under the above-described processing conditions, the surface roughness (arithmetical mean roughness Ra) of each of the first slide-contact surface A1 and the second slide-contact surface A2 is within the predetermined range (0.25 µm≤Ra≤0.5 µm).

Instead of controlling the surface roughness of the first slide-contact surface A1 of the flange 2B of the slinger 2 during the burring with the burring mold C, the surface roughness of the first slide-contact surface A1 may be controlled by performing press working as a separate step after the burring. The press working as the separate step refers to, for example, a simple step of merely pressing a planar mold.

Also in such a pressing step, the mold is pressed against the slide-contact surface A1 with the surface roughness (arithmetical mean roughness Ra) of the mold being set to 0.03 to 0.07 µm and with the pressure application force of the mold being set to 295 MPa to 433 MPa. Accordingly, the surface roughness (arithmetical mean roughness Ra) of the first slide-contact surface A1 falls within the predetermined range (0.25 µm≤Ra≤0.5 µm).

If the range (295 MPa to 433 MPa) of the pressure application force is generalized as a ratio to the 0.2% proof stress, the range is not less than 295/283≈1.0 and not greater than 433/283≈1.53.

It should be noted that the range of the pressure application force exceeds the 0.2% proof stress. Even if the range is 0.2% proof stress+53%, it has been confirmed through the following structural analysis that there is practically no problem since the sheet thickness did not significantly change.

<Structural Analysis>
(Purpose)

A pressure of the 0.2% proof stress×1.53 (433 MPa) is applied to the flange 2B of the slinger 2 by the stripper 6, the pressure under the condition of restriction with the burring mold C is eliminated, and then the amount of change in the sheet thickness (amount of plastic deformation in the sheet thickness direction) is checked.

(Geometric Model)

The slinger 2 is modeled (sheet thickness: 0.6 mm) with an axisymmetric element, and rigid bodies are used as the die 5 and the stripper 6 for applying pressure to the flange 2B.

(Material)

SUS430 is used, and the plastic zone thereof is also taken into consideration.

(Analysis Result)

The sheet thickness after elimination of the pressure (433 MPa) applied to the flange 2B of the slinger 2 was 0.582 mm, and the amount of plastic deformation in the sheet thickness direction was 0.018 mm.

This amount is within a range of ±0.1 mm which is the tolerance of the sheet thickness of the flange 2B of the slinger 2.

The same analysis result is obtained also for the manufacturing method (claim 2) in which a mold is pressed against the first slide-contact surface A1 of the slinger 2 in the pressing step that is a separate step from the burring. This is because the mold to be pressed against the first slide-contact surface A1 in the pressing step corresponds to the die 5 and the stripper 6.

In the above-described embodiment, SUS430 (magnetic material) has been described as an example of the dull-finished steel sheet material which is the raw material of the slinger 2. However, the dull-finished steel sheet material which is the raw material of the slinger 2 is not limited to the SUS430. For example, if no encoder is joined to the flange 2B of the slinger 2, the dull-finished steel sheet material may be SUS304 (non-magnetic material).

<Advantageous Effects>

In the above-described manufacturing method for the slinger 2 for use in the rotary seal 1 according to the embodiment of the present invention, the annular blank material B is molded from the dull-finished steel sheet material, and the annular blank material B is burred with the burring mold C or is burred and pressed, whereby the roughness of each of the first slide-contact surface A1 and the second slide-contact surface A2 of the slinger 2 can be set to fall within the predetermined range (0.25 µm≤Ra≤0.5 µm). Accordingly, the slinger 2 to be used in the rotary seal 1 can be inexpensively and efficiently manufactured.

In a particular method of the present invention, the annular blank material B is molded from the dull-finished steel sheet material and the annular blank material B is burred with the burring mold C, so that the surface roughness of each of the slide-contact surfaces A1 and A2 of the slinger 2 falls within the predetermined range (0.25 µm≤Ra≤0.5 µm). According to such a method, the surface roughness of both the first slide-contact surface A1 and the second slide-contact surface A2 of the slinger can be set to fall within the predetermined range through the burring. Accordingly, the separate step such as the pressing step becomes unnecessary, and thus the slinger 2 can be further inexpensively manufactured.

The predetermined range (0.25 µm≤Ra≤0.5 µm) is determined based on experiments by the inventors of the present application. The surface roughness of each of the first slide-contact surface A1 and the second slide-contact surface A2 of the slinger 2 is set to fall within the predetermined range, thereby reducing the wear amount of each of the axial lip 4B and the radial lips 4C and 4D while ensuring the oil film retainability.

In the slinger manufactured through the manufacturing method according to the present invention, the surface roughness of each of the first slide-contact surface A1 with which the axial lip 4B is in slidable contact and the second slide-contact surface A2 with which the radial lips 4C and 4D are in slidable contact, is within the predetermined range. Accordingly, in the rotary seal 1 using the slinger 2, the wear amount of each of the axial lip 4B and the radial lips 4C and 4D can be reduced with ensuring the oil film retainability.

The description of the above-described embodiment is in all aspects illustrative and not restrictive. Various improvements and modifications can be made without departing from the scope of the present invention.

What is claimed is:

1. A manufacturing method of a slinger to be used in a rotary seal that includes the slinger, a core metal, and a seal member, the slinger including a cylindrical sleeve and a flange extending outward in a radial direction from one end of the sleeve in an axial direction, the core metal including a core metal cylinder having a cylindrical shape, and a core metal flange extending inward in the radial direction from one end of the core metal cylinder in the axial direction, the seal member including a base portion joined to the core metal, and a seal lip portion extending from the base portion, the seal lip portion including an axial lip in slidable contact with a first slide-contact surface that is an inner surface of the flange of the slinger, and a radial lip in slidable contact with a second slide-contact surface that is an outer circumferential surface of the sleeve of the slinger, the manufacturing method comprising:

molding an annular blank material from a dull-finished steel sheet material through sheet metal press working, laser cutting machining, or wire cut electric discharge machining; and burring the annular blank material, so as to mold the slinger, wherein the burring is performed using a mold having faces each of which has an arithmetical mean roughness Ra set to 0.03 µm≤Ra≤0.07 µm, the faces individually coming into contact with the first slide-contact surface and the second slide-contact surface, a ratio of pressure application force for holding the annular blank material between the faces to a 0.2% proof stress of the dull-finished material, is set to 1.0 or more and 1.53 or less, a clearance for the mold used for the burring is set to T×(0.9 to 0.7) where "T" represents a sheet thickness of the annular blank material, and, with these conditions, an arithmetical mean roughness Ra of each of the first slide-contact surface and the second slide-contact surface of the slinger falls within a predetermined range of 0.25 µm≤Ra≤0.5 µm.

2. A manufacturing method of a slinger to be used in a rotary seal that includes the slinger, a core metal, and a seal member, the slinger including a cylindrical sleeve and a flange extending outward in a radial direction from one end of the sleeve in an axial direction, the core metal including a core metal cylinder having a cylindrical shape, and a core metal flange extending inward in the radial direction from one end of the core metal cylinder in the axial direction, the seal member including a base portion joined to the core metal, and a seal lip portion extending from the base portion, the seal lip portion including an axial lip in slidable contact with a first slide-contact surface which is an inner surface of the flange of the slinger, and a radial lip in slidable contact with a second slide-contact surface which is an outer circumferential surface of the sleeve of the slinger, the manufacturing method comprising:

molding an annular blank material from a dull-finished steel sheet material through sheet metal press working, laser cutting machining, or wire cut electric discharge machining;

burring the annular blank material, so as to mold the slinger; and pressing a mold against the first slide-contact surface of the molded slinger, wherein the burring is performed using a mold having a face that has an arithmetical mean roughness Ra set to 0.03 µm≤Ra≤0.07 µm, the face coming into contact with the second slide-contact surface, a clearance for the mold used for the burring is set to T×(0.9 to 0.7) where "T" represents a sheet thickness of the annular blank material, the pressing is performed using a mold having a face with an arithmetical mean roughness Ra set to 0.03 µm≤Ra≤0.07 µm, the face coming into contact with the first slide-contact surface, a ratio of pressing force for pressing the mold in the pressing to a 0.2% proof stress of the dull-finished material is set to 1.0 or more and 1.53 or less, and, with these conditions, an arithmetical mean roughness Ra of each of the first slide-contact surface and the second slide-contact surface of the slinger falls within a predetermined range of 0.25 µm≤Ra≤0.5 µm.

* * * * *